(12) United States Patent
Eggermont

(10) Patent No.: US 10,622,896 B1
(45) Date of Patent: Apr. 14, 2020

(54) METHODS AND SYSTEMS OF A SWITCHING POWER CONVERTER FOR CONTROLLING AVERAGE CURRENT AND WITH FREQUENCY ADJUSTMENT

(71) Applicant: SEMICONDUCTOR COMPONENTS INDUSTRIES, LLC, Phoenix, AZ (US)

(72) Inventor: Jean-Paul Anna Joseph Eggermont, Pellaines (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/661,841

(22) Filed: Oct. 23, 2019

Related U.S. Application Data

(60) Provisional application No. 62/881,631, filed on Aug. 1, 2019.

(51) Int. Cl.
*H05B 33/08* (2020.01)
*H02M 3/158* (2006.01)
*H05B 45/37* (2020.01)

(52) U.S. Cl.
CPC .......... *H02M 3/158* (2013.01); *H05B 45/37* (2020.01)

(58) Field of Classification Search
CPC ............ H05B 33/0809; H05B 33/0815; H05B 33/0839; H05B 33/0845
USPC .................................................. 315/294, 307
See application file for complete search history.

(56) References Cited

U.S. PATENT DOCUMENTS

| | | | |
|---|---|---|---|
| 8,054,056 B2 | 11/2011 | Coleman | |
| 8,203,288 B2 * | 6/2012 | Lee | H05B 45/50 315/308 |
| 9,287,798 B2 * | 3/2016 | Stamm | H05B 33/0815 |
| 9,614,438 B2 | 4/2017 | Davis | |
| 10,028,343 B2 | 7/2018 | Eggermont | |
| 2012/0081039 A1 * | 4/2012 | Yang | H05B 33/0815 315/307 |
| 2014/0042921 A1 * | 2/2014 | Van Den Broeke | H05B 33/08 315/200 R |

(Continued)

OTHER PUBLICATIONS

Wang et al., "Self-Adaptive Window Control Techniques for Hysteretic Buck Converter with Constant Frequency" IEEE Article 978-1-4673-5696-1/12, 2012.

*Primary Examiner* — Tung X Le
(74) *Attorney, Agent, or Firm* — Dickinson Wright PLLC; Mark E. Scott

(57) ABSTRACT

A switching power converter for controlling average current and with frequency adjustment. One example embodiment is a method of operating a switching power converter, the method including: operating the switching power controller at a switching frequency that is variable, each switching period comprises a charge mode of an inductor of the switching power converter and a discharge mode of the inductor; controlling, by a current control loop, average current provided from the switching power converter by controlling peak current in each charge mode of the inductor; and regulating, by a frequency control loop, the switching frequency of the switching power. The regulating may include: adjusting a relationship of output voltage to a length of discharge modes of the inductor; and changing the peak current through the inductor during charge modes.

20 Claims, 5 Drawing Sheets

(56) References Cited

U.S. PATENT DOCUMENTS

2016/0172981 A1\* 6/2016 Gritti ............... H02M 3/33507
363/21.12

\* cited by examiner

METHODS AND SYSTEMS OF A SWITCHING POWER CONVERTER FOR CONTROLLING AVERAGE CURRENT AND WITH FREQUENCY ADJUSTMENT

CROSS-REFERENCE TO RELATED APPLICATIONS

This application claims the benefit of U.S. Provisional Patent Application No. 62/881,631, filed on Aug. 1, 2019, the entire contents of which is incorporated herein by reference.

BACKGROUND

Light-emitting diodes (LEDs) are increasingly popular for lighting systems for a variety of reasons. The reasons may include greater light produced per unit of power supplied to the LED (compared, for example, to incandescent bulbs), and controllability of the LEDs. The increased popularity of LEDs is also true for the automotive industry.

At least in the context of the automotive industry, LEDs are controlled by controlling average current through the LEDs. However, currently available LED controllers exhibit wide operating frequency swings as the LED voltages vary. That is, as LEDs are switched in and out of operation, such as turning on and off LEDs that provide "high beam" lights for a car, the voltage across the LEDs as a group may swing which causes significant changes in operating frequency of the LED controller. The significant changes in operating frequency make electrical noise and electromagnetic interference (EMI) difficult to suppress.

BRIEF DESCRIPTION OF THE DRAWINGS

For a detailed description of example embodiments, reference will now be made to the accompanying drawings in which.

DEFINITIONS

Figure 1:
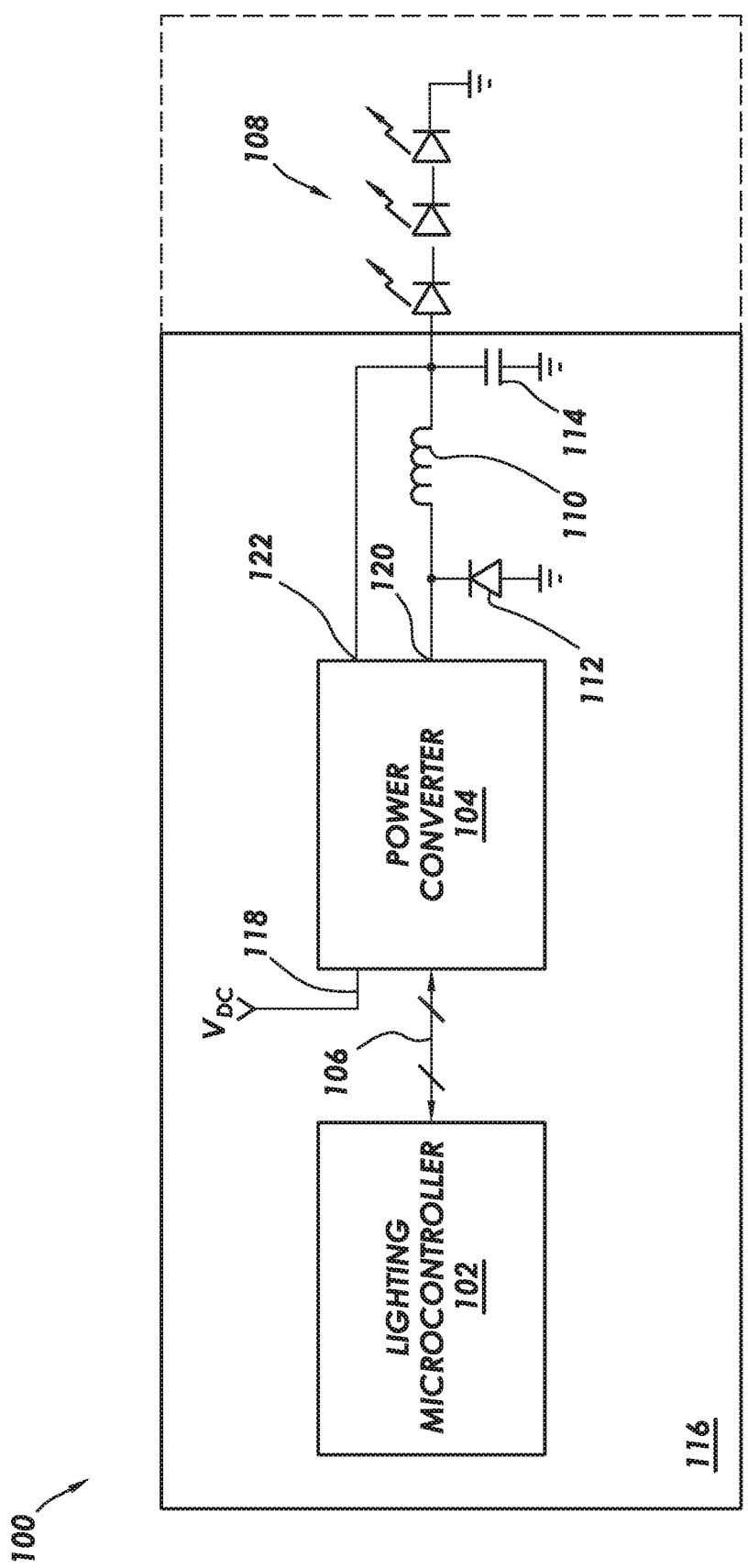
FIG. 1 shows a block diagram of a system for operating LEDs in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Controller" shall mean, alone or in combination, individual circuit components, an application specific integrated circuit (ASIC), a microcontroller with controlling software, a digital signal processor (DSP), a processor with controlling software, or a field programmable gate array (FPGA). The controller is configured to read inputs and drive outputs responsive to the inputs.

"Length" shall mean a length of time, and shall not mean a measure of distance.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems of a switching power converter for controlling average current provided to light-emitting diodes (LEDs), and including frequency adjustment. More particularly, example embodiments are directed to systems including a lighting microcontroller communicatively coupled to a buck-type direct current (DC) to DC switching power converter executing average current control, with the switching power converter driving the LEDs by way of an inductor. The example switching power converters are designed and constructed to control average current provided to LEDs, and also to better control or limit switching frequency of the switching power converter. The specification first turns to a high level description of an example system.

FIG. 1 shows a block diagram of a system for operating LEDs in accordance with at least some embodiments. In particular, FIG. 1 shows an example system 100, which could be a lighting system for an automobile, or a lighting system for a home, to name a few. The example system 100 comprises a lighting microcontroller 102. The lighting microcontroller 102 may communicate with other devices and implement an overall lighting control strategy for many LEDs within a system (e.g., automobile, home). The example lighting microcontroller 102 communicatively couples to a switching power converter 104 (hereafter just "power converter 104") by way of a communication channel 106. The communication channel 106 may take many forms. In some cases the communication channel may be a plurality of conductors upon which analog and/or Boolean signals may be exchanged between the lighting microcontroller 102 and the power converter 104. In other cases, the communication channel may be a parallel or serial communication bus. In one specific embodiment, the communication channel 106 is a serial peripheral interface (SPI) bus, but other bus systems and protocols may be used (e.g., I²C bus, Universal Serial Bus (USB)).

The power converter 104 in the example system is a driver circuit designed and constructed to convert power at one DC voltage to another DC voltage. In the example system, the power converter 104 converts power from a voltage source $V_{DC}$ to a lower voltage (based on additional circuits discussed below), and thus may be referred to as a buck-type DC to DC power converter. The functionality of the power converter 104 is implemented by various circuits (discussed more below) constructed on one or more semiconductor substrates. The semiconductor substrate(s) may be packaged in any suitable form, such as a dual in-line package (DIP). Other packaging configurations may be equivalently used.

The power converter 104 couples to the LEDs 108 by way an inductor 110. In particular, the power converter 104 couples to a first lead of the inductor 110, and the second lead of the inductor 110 couples to the LEDs 108. The LEDs 108 are illustratively shown as three LEDs coupled in series, but one or more LEDs in any electrical configuration may be used. Because the example system operates as a switching power converter, during some portions of the operation the power converter 104 provides no electrical current to the inductor 110 (e.g., as the current through the inductor 110 is discharging). During periods of time when the inductor 110 is discharging, the freewheeling diode 112, coupled between the first lead of the inductor and ground or common, provides the conduction path for the inductor 110 current. In other cases, a synchronous rectifier (e.g., operationally controlled field-effect transistor (FET)) may be used in place of the freewheeling diode 112. The circuit components may also include smoothing capacitor 114 to smooth the output voltage provided to the LEDs 108.

The example system 100 may be implemented with the various components in separate physical locations. For example, in automotive systems the lighting microcontroller 102 may reside within the cab of the automobile, while the power converter 104 may reside in the engine compartment, and the LEDs 108 disposed as headlights or fog lights for the automobile. In other cases, the example system 100 may be coupled in whole or part on an underlying printed circuit board (PCB). As shown in FIG. 1, the lighting microcontroller 102, the power converter 104, and the various circuit components (e.g., freewheeling diode 112, inductor 110, and smoothing capacitor 114) may reside on a single PCB 116, with the LEDs 108 disposed elsewhere. Alternatively, the LEDs 108 may also be disposed on the PCB 116 (as shown by the dashed extension of the PCB 116 of FIG. 1).

The power converter 104 thus has a $V_{DC}$ input 118 coupled to the voltage source $V_{DC}$. The power converter 104 also has a switch node 120 coupled to the node between the freewheeling diode 112 and inductor 110. The power converter 104 may optionally include a voltage sense input 122 coupled to the second lead of the inductor (e.g., coupled to sense voltage provided to the LEDs 108). In accordance with example embodiments the lighting microcontroller 102 may command certain actions within the power converter 104 (the actions discussed more below), such as setting an average current to be provided to the LEDs 108. The specification now turns to a more detailed description of the power converter 104.

Figure 2:
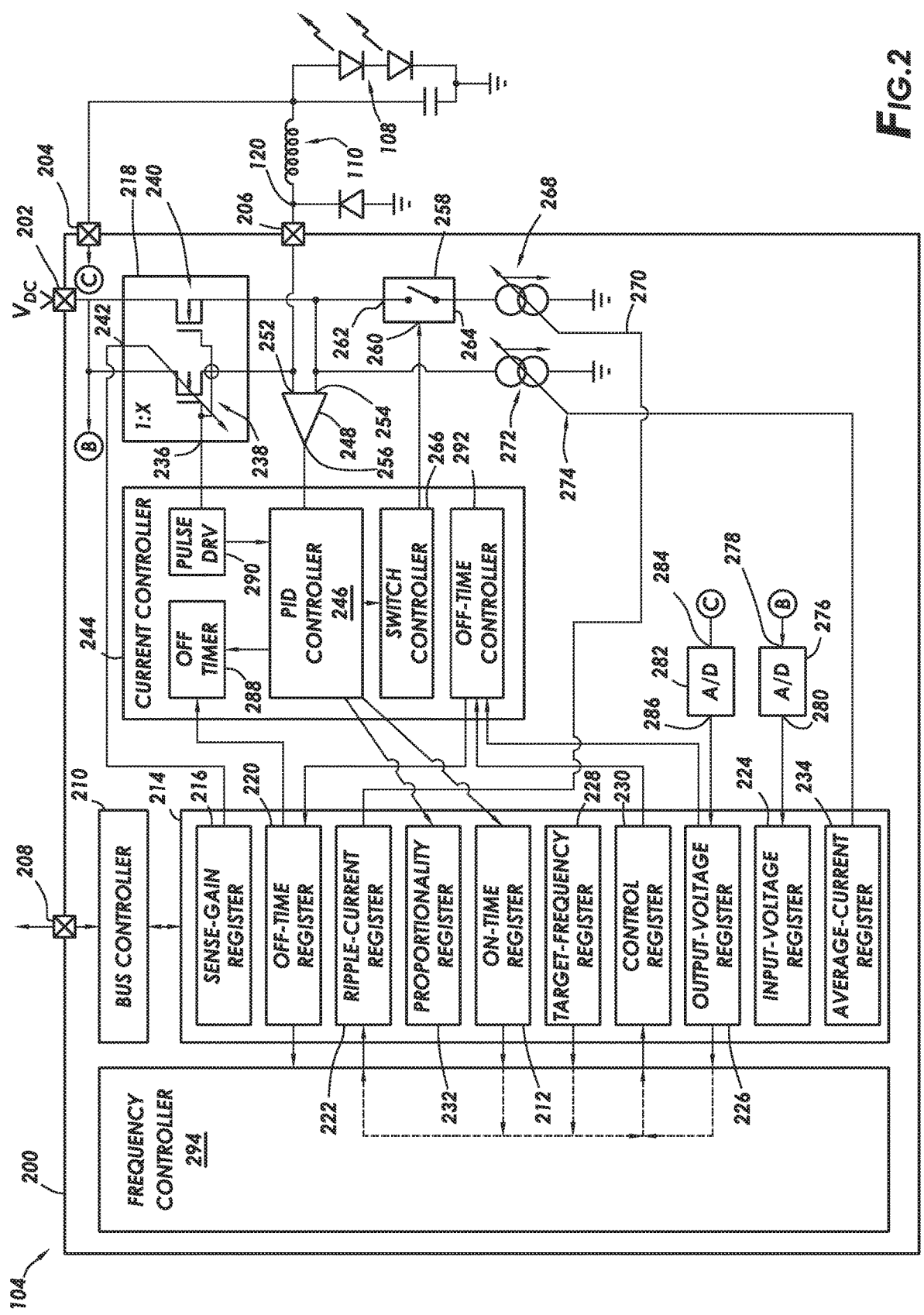
FIG. 2 shows an electrical block diagram of a power converter 104 in accordance with at least some embodiments.

FIG. 2 shows an electrical block diagram of a power converter 104 in accordance with at least some embodiments. The power converter 104 may take the form of a packaged integrated circuit (IC) 200. The packaging encapsulates a semiconductor die or chip, or multiple semiconductor dies (e.g., a multi-chip module) upon which the various circuits are monolithically constructed. The example power converter 104 defines an input voltage terminal 202, an output voltage terminal 204, a switch-node terminal 206, and a bus interface 208. The bus interface 208 may comprise additional terminals depending on the type of interface implemented. Additional terminals will be present (e.g., a common or ground terminal, Vcc terminal), but those additional terminals are not shown so as not to unduly complicate the figure.

The example power converter 104 comprises a bus controller 210 coupled to the bus interface 208, and over which the bus controller 210 is configured to communicate with external devices, such as the lighting microcontroller 102 (FIG. 1). The example system further comprises a plurality of registers 214 accessible by the bus controller 210. That is, the bus controller 210, and thus the lighting microcontroller 102, may read and/or write the plurality of registers 214 as part of setting up the power converter 104 for initial operation, and controlling the power converter 104 during operation.

The example system of FIG. 2 shows ten registers in the plurality of registers 214, though other registers may be present. The registers may comprise an on-time register 212. The on-time register 212 holds a value indicative of the most recent on-time of the power converter 104. The registers may comprise a sense-gain register 216. In the example system a power switch 218 implements a sensing or reference transistor (discussed more below) whose Ron resistance is a known quantity higher than the main transistor (also discussed more below). The sense-gain register 216 holds a value indicative of the relationship or ratio of Ron resistance of the reference transistor relative to the main transistor. The registers may further comprise an off-time register 220. The off-time register 220 holds a value indicative of off time of the pulse signal applied to the power switch 218. Stated otherwise, the off-time register 220 holds a value indicative length of discharge modes of the inductor 110 (FIG. 1). A ripple-current register 222 may be implemented. The ripple-current register 222 holds a value indicative of ripple current, which register may be initially written by the lighting microcontroller 102 by way of the bus interface 208; however, the value indicative of ripple current in the ripple-current register 222 is an indirectly controlled variable of a current control loop of the power converter 104, and thus may change during operation.

The example plurality of registers 214 may further comprise an input-voltage register 224. The input-voltage register 224 holds a value indicative of the input voltage $V_{DC}$ supplied to the power converter 104. An output-voltage register 226 may be implemented. The output-voltage register 226 holds a value indicative the output voltage of the power converter 104. A target-frequency register 228 may be implemented. The target-frequency register 228 holds a value indicative of a target frequency of operation of the power converter 104. A control register 230 may be implemented. The control register 230 holds a value indicative of a mathematical relationship between the length of discharge modes of the inductor and the output voltage of the switching power converter. The control register 230 may be initially written by the lighting microcontroller 102 by way of the bus interface 208; however, the value in the control register 230 becomes a control variable of a frequency control loop for the power converter 104, and thus may change during operation. A proportionality register 232 may be implemented. The proportionality register 232 holds a proportionality value used to adjust peak current by the frequency control loop, as discussed more below. And finally, an average-current register 234 may be implemented. The average-current register 234 holds a value indicative of a set point average current. In example systems, the value indicative of set point average current is the set point of the current control loop for the power converter 104, and is written by the lighting microcontroller 102 (FIG. 1).

The power converter 104 further comprises the power switch 218 having a gate input 236. In particular, the power switch 218 comprises a main transistor 238 having its drain coupled to the input voltage $V_{DC}$ by way of the input voltage terminal 202, having its source coupled to the LEDs 108 by way of the switch-node terminal 206 (and thus coupled to the switch node 120), and having a gate coupled to the gate input 236. The power switch 218 further comprises a reference transistor 240 likewise having its drain coupled to the input voltage $V_{DC}$, and a gate coupled to the gate input 236. In example systems, when the gate input 236 is asserted both the main transistor 238 and the reference transistor 240 enable current flow from drain to source. As will be described more below, a known reference current is drawn through the reference transistor 240, and the known reference current creates a reference voltage. In some systems, the ratio of Ron resistance as between the main transistor 238 and the reference transistor 240 may be settable or adjustable. In such systems the ratio (1:X) is controlled by the value in the sense-gain register 216, with the sense-gain register 216 coupled to a control input 242 of the power switch 218.

Still referring to FIG. 2, the example power converter 104 further comprises a current controller 244. The current controller 244 produces control signals used within the power converter 104, and in some cases the current controller 244 implements the current control loop to control average current produced by the power converter 104 (e.g., by way of a proportional-integral-differential (PID) controller 246). The current controller 244 is coupled to the gate input 236 of the power switch 218. The current controller 244 is configured to generate a pulse signal on the gate input 236 of the power switch 218. The de-asserted time of the pulse signal (i.e., the discharge mode of the inductor) is based on the value indicative of off time held in the off-time register 220. The asserted time of the pulse signal (i.e., the charge mode of the inductor) is based on the value indicative of average current held in the average-current register 234 and the most recent value indicative of ripple current held in the ripple-current register 222. As shown in FIG. 2, in example embodiments the average-current register 234 is not directly coupled to the current controller 244. The control relationship between the value indicative of off time, the value indicative of average current, and the pulse signal is discussed in greater detail below after introduction of other circuit components of the power converter 104.

The example power converter 104 further comprises a comparator 248 that has a first comparator input 252, a second comparator input 254, and a comparator output 256. The first comparator input 252 is coupled to the source of the main transistor 238, and the second comparator input 254 is coupled to the source of the reference transistor 240. The comparator output 256 is coupled to the current controller 244. Example system further comprises a current switch 258 having a control input 260, a first switch lead 262, and a second switch lead 264. The first switch lead 262 is coupled to the source of the reference transistor 240 (and the second comparator input 254). The control input 260 of the current switch 258 is coupled to the current controller 244, and in particular a switch controller 266 within the current controller 244.

The example system further comprises a current source 268 coupled to the second switch lead 264 of the current switch 258. The current source 268 may take any suitable form, such as a digital-to-analog converter producing a controlled current. The current source 268 has a control input 270 (e.g., a digital input) that sets the controlled current flow through the current source 268. The control input 270 couples to the ripple-current register 222, and thus the value indicative of ripple current in the ripple-current register 222 sets the current provided by current source 268. The system further comprises a second current source 272 coupled to the second comparator input 254 (and the source of the reference transistor 240). The current source 272 likewise may take any suitable form, such as a digital-to-analog converter producing a controlled current. The current source 272 has a control input 274 that sets the controlled current flow through the current source 272. The control input 274 couples to the average-current register 234, and thus the value indicative of average current in the average-current register 234 sets the current provided by the current source 272.

Still referring to FIG. 2, the example power converter 104 also comprises an analog-to-digital (A/D) converter 276 having an analog input 278 and a digital output 280. The analog input 278 is coupled to the input voltage $V_{DC}$ (as shown by bubble "B"). The digital output 280 is coupled to the input-voltage register 224. During operation the A/D converter 276 periodically updates the input-voltage register 224 with the input voltage provided to the power converter 104. The example power converter 104 also comprises A/D converter 282 having an analog input 284 and a digital output 286. The analog input 284 is coupled to the output voltage of the converter, and more particularly the node between the inductor 110 and the LEDs 108 (as shown by bubble "C"). The digital output 286 is coupled to the output-voltage register 226. The A/D converter 282 periodically updates the output-voltage register 226 with an indication of the output voltage provided by the power converter 104.

Referring more specifically now to the current controller 244. The current controller 244 implements the PID controller 246 and the switch controller 266 previously introduced. The example current controller 244 further implements an off timer 288, a pulse driver 290, and an off-time controller 292. The off timer 288 couples to the off-time register 220. Based on the value indicative of off time held in the off-time register 220, the off timer 288 controls the off time implemented by the pulse driver 290. In particular, based on assertion of a signal from the PID controller 246 indicating the end of a charge mode, the off timer 288 asserts a signal to the pulse driver 290 and keeps the signal asserted for a period of time indicated in the off-time register 220. The assertion of the signal to the pulse driver 290 causes the pulse driver 290 to de-assert the pulse signal to the power switch 218, thus implementing a discharge mode. Once the signal from the off timer 288 to the pulse driver 290 is de-asserted, the pulse driver 290 asserts the pulse signal to the power switch 218 and thus starts a new charge mode. The switch controller 266 and the off-time controller 292 are discussed more below after a discussion of initial setup.

During initial setup, the lighting microcontroller 102 (FIG. 1) provides certain information to the plurality of registers 214 used by the power converter 104. For example, the lighting microcontroller 102 may write into the sense-gain register 216 a value indicative of the ratio of Ron resistances of the main transistor 238 and the reference transistor 240 such that the power switch 218 implements the desired ratio. For a particular system design and setup (e.g., expected input voltage and expected output voltage), the lighting microcontroller 102 (FIG. 1) may write into the control register 230 an initial value indicative of a mathematical relationship between the length of discharge modes of the inductor and expected output voltage of the switching power converter.

For proper operation of the power converter 104 the off time implemented by the off timer 288 (as read from the off-time register 220) is periodically updated based on the output voltage and the value in the control register 230. In particular, in the example embodiments the off-time controller 292 couples to and periodically reads the output voltage register 226 and the control register 230. The off-time controller 292 may divide the value in the output-voltage register 226 (or some variant thereof, such as the average over a predetermined period of time) by the value in the control register 230, and the resultant is a value indicative of off time written to the off-time register 220 and used by the off timer 288 for the next discharge mode. Prior to the power converter 104 generating an output voltage, however, the lighting microcontroller 102 writes a value into the off-time register 220 to enable the power converter 104 to begin initial operation, and the off-time controller 292 does not make the periodic updates until the power converter 104 has operated for a predetermined period of time.

The lighting microcontroller 102 (FIG. 1) may further write an initial value into the ripple-current register 222 and write an initial value into the proportionality register 232. The value held in the ripple-current register 222 and the value in the proportionality registers 232 are variable during operation. In related art power converters the current controller (e.g., a PID controller within the current controller) directly updated the value in the ripple current register 222 as part of controlling average current. For reason associated with frequency regulation implemented in example embodiments, in operation the PID controller 246 (illustratively shown within the current controller 244) updates the value in the proportionality registers 232, which causes an update in the value in the ripple-current register 222. The relationship of the value in the ripple-current register 222 to the value in the proportionality register 232 is discussed more below with respect to the frequency controller 294. The current source 268 produces a current related to the ripple current, and the current source 268 play a role in setting the on time of the pulse signal provided to the gate input 236 of the power switch 218, as discussed more below.

Still as part of initial setup, the lighting microcontroller 102 may further write into the average-current register 234 a value indicative of average current, which is effectively the set point for the current control loop implemented by the power converter 104. Thus, the current source 272 produces a current related to average current, and the current source 272 plays a role in setting the on time of the pulse signal provided to the gate input 236 of the power switch 218, as discussed more below.

Figure 3:
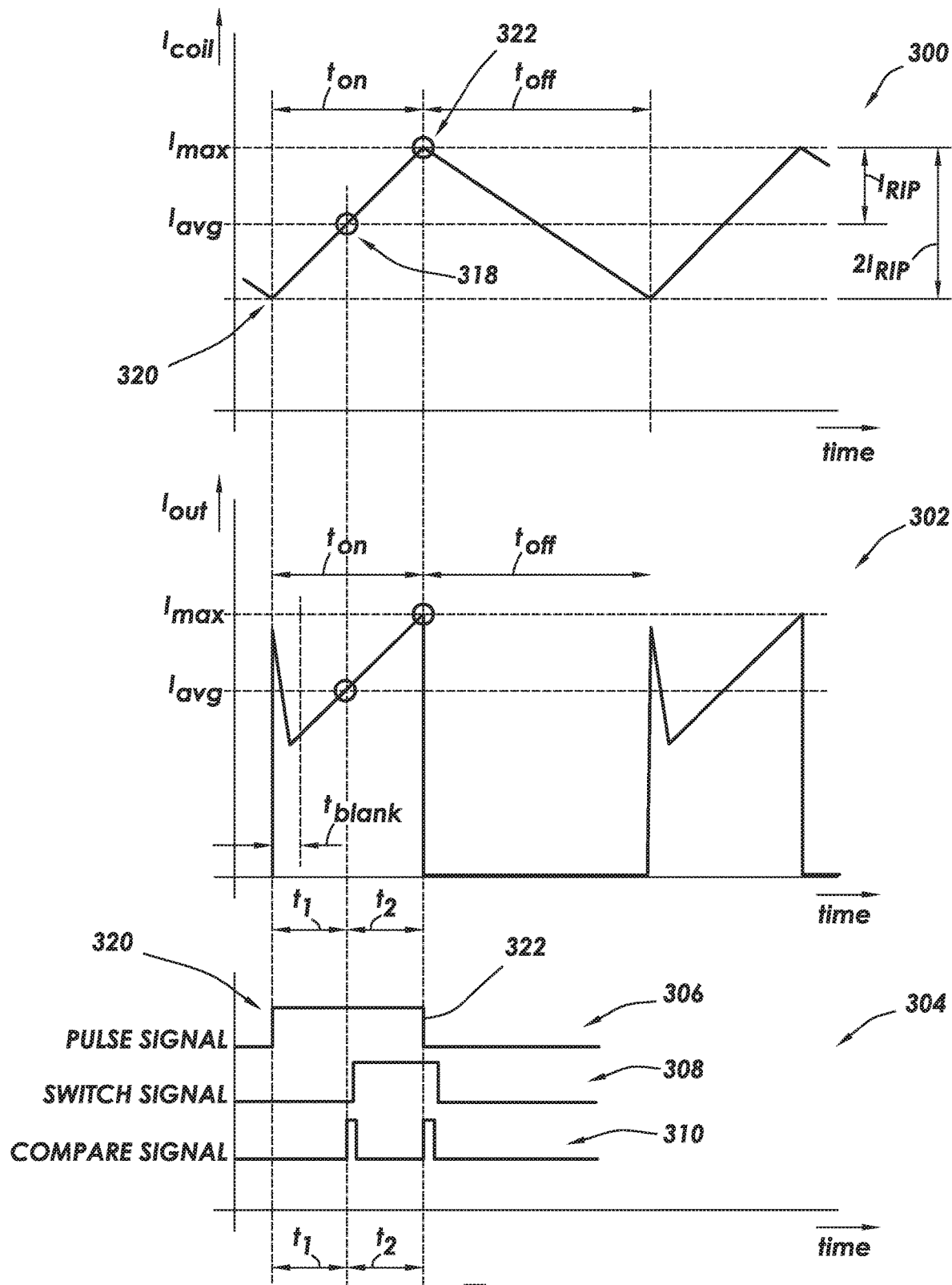
FIG. 3 shows a timing diagram in accordance with at least some embodiments.

FIG. 3 shows a timing diagram in accordance with at least some embodiments. In particular, plot 300 shows the inductor current as a function of time, and in particular through about 1.5 switching periods. Plot 302 shows the current through the main transistor 238 as a function of time. Plot 304 shows a plurality of example Boolean signals within the system, and in particular shows the pulse signal 306 provided to the gate input 236 of the power switch 218, the switch signal 308 provided to the control input 260 of the current switch 258, and a compare signal 310 created by the comparator 248.

Referring simultaneously to FIGS. 2 and 3 (and specifically plots 300 and 304), the specification now turns to operation of the power converter 104, and specifically the current control loop of the power converter 104. At the expiration the off timer 288 (time 320) the pulse signal 306 is asserted by the pulse driver 290, thus beginning a charge mode. The power switch 218 is thus activated and the current through inductor begins to rise as shown in plot 300. After a period of time referred to as on time $t_{ON}$, the current through the inductor reaches a peak current referred to in plot 300 as $I_{MAX}$. When the inductor current reaches the peak current $I_{MAX}$ at time 322, the off timer 288 is triggered, causing the pulse signal 306 to be de-asserted (i.e., the power switch 218 becomes non-conductive), and thus the charge mode ends and the contiguous discharge mode begins. The power converter 104 remains in the discharge mode for period of time referred to as off time $t_{OFF}$ in FIG. 3. And then the cycle repeats with the next charge mode.

For a constant input voltage and constant output voltage, the on time $t_{ON}$ and off time $t_{OFF}$ will be constant when providing the set point average current in a steady-state condition. However, varying physical conditions may cause changes. For example, ambient temperature swings may change the effective inductance of the inductor 110. Ambient temperature swings may change the impedance of the wiring to the LEDs. The input voltage may vary. The output voltage may vary based on changes in the input voltage, or the output voltage may change based on changes in the number of LEDs 108 as LEDs are switched in and out of service.

In order to provide the set point average current in spite of the varying physical conditions, the power converter 104 controls several variables. For example, the on time $t_{ON}$ may be adjusted from charge mode to charge mode by adjusting the peak current $I_{MAX}$ level. The off time $t_{OFF}$ may likewise be periodically adjusted based on the output voltage. Each of the on time $t_{ON}$ and off time $t_{OFF}$ will be addressed in turn.

The on time $t_{ON}$ can be conceptually divided into a first period t1 and a second period t2 as shown in FIG. 3. The first period t1 begins when the pulse signal 306 is asserted and the power switch 218 becomes conductive, and the first period ends when the current through the inductor meets a mid-point current 318. The second period t2 begins when the current through the inductor meets the mid-point current 318 and ends when the current reaches peak current $I_{MAX}$ at time 322. When the length of the first period t1 matches the length of the second period t2, it works out mathematically that the mid-point current 318 is the average current $I_{AVG}$ provided to the LEDs 108. The power converter 104 (and specifically the PID controller 246) thus monitors the length of the first period t1 and the length of the second period t2, and regulates the system to have the length of the first period t1 match the length of the second t2 in steady-state operation.

The current control implemented by the example power converter 104 may be referred to as constant-ripple average-current control. In such systems, the peak current $I_{MAX}$ is controlled to control average current. The relationship between ripple current, the average current $I_{AVG}$, and the peak current $I_{MAX}$ is shown in plot 300. In particular, in steady-state operation the peak-to-peak current value is twice the ripple current (i.e., $2*I_{RIP}$) as illustrated. It follows that the relationship between ripple current $I_{RIP}$ and the peak current $I_{MAX}$ is that the $I_{MAX}$ is $I_{AVG}$ plus $I_{RIP}$. Conceptually then, during transient cycles when the length of the first period t1 does not equal the length of the second period t2, during the immediately subsequent off time the PID controller 246 adjusts the value in the proportionality register 232, which results in an adjustment to the value indicative of ripple current in the ripple-current register 222. The adjustment to the value indicative of ripple current results in an adjustment to the peak current $I_{MAX}$ in an attempt to force the lengths of t1 to equal t2 in the next on time $t_{ON}$. For example, if the length of the first period t1 is greater than the length of the second period t2 in a first charge mode, the value indicative of ripple current is increased (i.e., the peak current $I_{MAX}$ is increased) in an attempt to lengthen the second period t2 in the next charge mode. Oppositely, if the length of the first period t1 is less than the length of the second period t2 in a first charge mode, the value indicative of ripple current is decreased (i.e., the peak current $I_{MAX}$ is decreased) in an attempt to shorten the length of the second period t2 in the next charge mode.

Before turning to the example implementation of measuring the length of first period t1 and the second period t2 by the power converter 104, attention turns briefly to plot 302. Again, plot 302 shows current through the main transistor 238. When the pulse signal 306 is asserted (i.e., when a charge mode begins), both the reference transistor 240 and the main transistor 238 become conductive. Because of parasitic capacitances within the system 100, initially there may be a high inrush current that in some cases may exceed even the expected average current $I_{AVG}$. The inrush current is not truly indicative of inductor current (as shown by plot 300), and thus in order to avoid false indications by the comparator 248, the example system may implement a blanking time $t_{BLANK}$.

Still referring to simultaneously to FIGS. 2 and 3, in accordance with example embodiments the length of the on time $t_{ON}$ is measured by the current controller 244 using a combination of the comparator 248, the current switch 258, and the current sources 268 and 272. In particular, during the first period t1, the current switch 258 is off or non-conductive. Thus, of the two current sources 268 and 272, only current source 272 is coupled to the second comparator input 254 during first period t1. The current source 272 drives a current proportional to the value indicative of average current held in the average-current register 234 (i.e., the set point average current). Comparator 248 thus compares the voltage on the source of the main transistor 238 (which voltage is proportional to current through the main transistor 238) to a voltage on the source of the reference transistor 240 (the voltage fixed by current source 272). When the magnitudes of the voltages cross (indicating the average current $I_{AVG}$ has been met), the comparator 248 asserts comparator output 256 as shown by compare signal 310. Once the compare signal 310 is asserted, the current controller 244 (e.g., the switch controller 266) asserts the control input 260 of the current switch 258, thus closing or making conductive the current switch 258.

Closing of the current switch 258 couples the current source 268 into the circuit coupled to the second comparator input 254. The compare signal 310 on the comparator output 256 is thus de-asserted again as shown in plot 310, and the comparator 248 continues to compare the voltage on the source of the main transistor 238 to a voltage on the source of the reference transistor 240 (the voltage now fixed by current sources 268 and 272). When the magnitudes of the voltages again cross (indicating the peak current $I_{MAX}$ has been met), the comparator 248 again asserts comparator output 256 as shown by compare signal 310. The second assertion of the compare signal 310 is the end of the on time $t_{ON}$ and the beginning of the off time $t_{OFF}$. For purposes of control, length of the first period t1 is measured by the current controller 244 as the time between assertion of the pulse signal 306 (or, equivalently, expiration of the off timer) and the first assertion of the compare signal 310. The length of the second period t2 is measured by the current controller 244 as the time between the first and second assertions of the compare signal 310. In some example systems, the PID controller 246 receives indications of the lengths of periods t1 and t2 and makes adjustments to the value in the proportionality register 232 (which causes adjustments to the value in the ripple-current register 222) in an attempt to balance the lengths of the periods t1 and t2 in the next charge mode. For purposes of frequency regulation, the current controller 244 (e.g., PID controller 246) also writes a value indicative of on time in the on-time register 212.

Now referring to off time $t_{OFF}$ considerations. In example systems, as the output voltage (measured between the inductor 110 and the LEDs 108) changes, the power converter 104 also changes the off time in order to maintain a constant or near-constant ripple current. In particular, in example embodiments the value indicative of the mathematical relationship between the length of discharge modes of the inductor and output voltage held within the control register 230 may be initially set as the mathematical product of the expected output voltage and the expected off time. During operation, and as the actual output voltage changes (e.g., LEDs are switched in and out of the circuit), the value indicative of off time in the off-time register 220 is periodically updated to account for changes in output voltage measured by the A/D converter 282. Thus, as output voltage changes (or as average output voltage changes), the value indicative of off-time also changes by operation of the off-time controller 292. More particularly, if the value in the control register 230 remains constant, the off time generated by the off timer 288 is inversely proportional to the output voltage in order to keep the ripple current constant as the output voltage changes.

With respect to the current control loop implemented by the current controller 244, the frequency of operation of the power converter 104 changes over time. For example, if actual average current is below the set point average current (e.g., if the first period t1 shorter than the second period t2), in the next charge mode the on time $t_{ON}$ decreases and thus frequency of operation increases. Oppositely, if actual average current is above the set point average current (e.g., if the first period t1 longer than the second period t2), in the next charge mode the on time $t_{ON}$ increases and thus frequency of operation decreases. Likewise, the frequency of operation of the power converter 104 changes when the output voltage changes. For example, if output voltage increases the off time $t_{OFF}$ decreases, thus increasing the frequency of operation. Oppositely, if output voltage decreases the off time $t_{OFF}$ increases, thus decreasing the frequency of operation.

The frequency of operation of the related-art power controllers can vary widely. For example, a related-art power controller being supplied an input voltage $V_{DC}$ of 50 Volts, and with output voltage changing within the range of 5 Volts to 45 Volts, may experience a frequency variation of +/−45%. Wide swings in operating frequency make electrical noise and electromagnetic interference (EMI) difficult to suppress.

Various example embodiments operate the power converter 104 in such a way as to regulate switching frequency of the power converter 104. In particular, example embodiments implement not only the current control loop noted above (e.g., by the current controller 244), but also implement a frequency control loop that helps regulate the switching frequency of the power converter. The frequency control loop in example embodiments controls switching frequency by adjusting the relationship of output voltage to the length of discharge modes of the inductor (e.g., adjusting the value in the control register 230). When adjustments are made to the value in the control register 230, the frequency control loop also changes the peak current $I_{MAX}$.

More particularly, in example cases the frequency control loop regulates switching frequency by adjusting the value in the control register 230, the adjustment proportional to a change in output voltage (e.g., average output voltage over a predetermined period of time), and changing the peak current $I_{MAX}$ proportional to the change in output voltage. More particularly still, in example cases the frequency control loop regulates switching frequency by adjusting the value control register 230 directly proportional to a change in output voltage, and by changing the peak current $I_{MAX}$ directly proportional to the change in output voltage. In some cases, the change to the peak current $I_{MAX}$ may be based on a proportionality value (e.g., the value held in the proportionality register 232).

Referring again to FIG. 2. The example power converter 104 further comprises the frequency controller 294 communicatively coupled to the plurality of registers 214. The frequency controller 294 implements the frequency control loop. To that end, the frequency controller 294 is designed and constructed to read and write various registers in the plurality of registers 214. While FIG. 2 shows the frequency controller 294 directly accessing various registers, in other embodiments the frequency controller 294 may access the registers by way of the bus controller 210. In example embodiments the frequency controller 294 may have read access to the input-voltage register 224, output-voltage register 226, the control register 230, the target-frequency register 228, the proportionality register 232, the ripple-current register 222, the on-time register 212, and the off-time register 220. Further, the example frequency controller 294 may have write access to the control register 230 and the ripple-current register 222.

In example embodiments, the frequency controller 294 regulates the switching frequency by adjusting the value in the control register 230. More particularly, the frequency controller 294 reads the value indicative of target frequency in the target-frequency register 228. The frequency controller 294 monitors switching frequency of the power converter 104. For example, the frequency controller 294 may directly sense a change in switching frequency by reading the value in the on-time register 212 and the value in the off-time register 220 (e.g., the sum of the values is the switching period, and the inverse of the sum is the switching frequency). The frequency controller 294 may indirectly sense a change in switching frequency by sensing changes in the input-voltage by reading the input-voltage register 224. The frequency controller may indirectly sense a change in switching frequency by sensing changes in the output voltage by reading the output-voltage register 226.

Regardless of how the frequency controller 294 determines the switching frequency has changed, when the switching frequency indicates regulation is desirable the frequency controller 294 adjusts the value in the control register 230. In some cases, the frequency controller 294 lets the current controller 244 (e.g., the off-time controller 292) update the value in the off-time register 220 based on the change to the control register 230, but in other cases the frequency controller 294 also updates the off-time register 220 when a change is made the control register 230 to avoid any lag in the update to the off-time register 220.

As implied by FIG. 3 and the related discussion, the control variables are all interrelated such that a change in one control variable may result in changes to other control variables to achieve steady-state operation in the constant-ripple average-current control. An adjustment to the off time $t_{OFF}$ made by the frequency controller 294 will eventually result in a change in the peak current $I_{MAX}$ by operation of the current control loop. If unassisted, it may take the current control loop several switching periods to achieve the correct peak current $I_{MAX}$. Thus, in some example embodiments, when the frequency controller 294 makes adjustments to regulate switching frequency, the frequency controller 294 also makes a change in the peak current $I_{MAX}$. In one example case, the frequency controller 294 changes the peak current $I_{MAX}$ by revising the value in the ripple-current register 222. In particular, when the frequency controller 294 modifies the value in the control register 230, the frequency controller 294 contemporaneously revises the value in the ripple-current register 222. In example cases, the value in the ripple-current register 222 is the product of the value in the control register 230 and the value in the proportionality register 232. Thus, when the value in the control register 230 is modified by the frequency control loop to affect a change in frequency, the value in the ripple-current register 222 is contemporaneously and automatically revised without affecting the value in the proportionality register 232 (that is controlled by the current control loop). The contemporaneous change in the value in the ripple-current register 222 with changes to the value in the control register 230 is a reason why the current control loop in example embodiment updates the proportionality register 232 as part of average current control rather than directly updating the value in the ripple current register 222. The change in the peak current $I_{MAX}$ implemented by the frequency controller 294 can be considered a feed forward change or adjustment that assists the current control loop in providing the set point average current.

Moreover, given the interrelatedness of the control variables and the fact several variables are controlled by both the current controller 244 and the frequency controller 294 (e.g., the ripple-current register 222 and off-time register 220), in order to reduce or avoid undesirable interactions between the current controller 244 and the frequency controller 294, the two controllers may update controlled variables at different frequencies. For example, in some systems the current controller 244 may make revisions to the value in the proportionality register 232 (e.g., during transient conditions) after the end of each on time $t_{ON}$ (i.e., during a contiguous off time $t_{OFF}$). Thus, the current controller 244 may be updating at the switching frequency of the power converter 104 (e.g., 100 kilo-Hertz (kHz) or more). In order to cause the change in the value in the ripple-current register 222 contemporaneously with changes in the value in the proportionality registers 232, the frequency controller 294 may also update the value in the ripple-current register 222 during a contiguous off time a contiguous off time $t_{OFF}$.

By contrast, the frequency controller 294 may make adjustments to control switching frequency of the power converter 104 at a lower rate (e.g., 1 kHz when the switching frequency of the power converter 104 is 100 KHz). In this way, undesirable interactions between the current controller 244 and the frequency controller 294 are reduced or avoided.

In some embodiments the frequency controller 294 acts to control the switching frequency in an open-loop sense. For example, it can be mathematically shown that a good approximation of the value in the control register 230 to have the switching frequency at or near the target frequency is achieved by the following equation:

$$V_{OUT}*T_{OFF}=(V_{DC}-V_{OUTNEW})/V_{DC}/\text{target\_frequency} \quad (1)$$

where "$V_{OUT}*T_{OFF}$" is the value to be placed in the control register 230, $V_{DC}$ is the currently existing input voltage, $V_{OUTNEW}$ is the currently existing output voltage (measured between the inductor and the LEDs), and target_frequency is the target frequency (e.g., held in the target-frequency register 228). Thus, in some embodiments the frequency controller 294 periodically reads the various registers, and updates the value in the control register 230 to regulate the switching frequency to be at or near the target frequency. In other cases, however, the frequency controller 294 acts to control the switching frequency in closed-loop sense.

Figure 4:
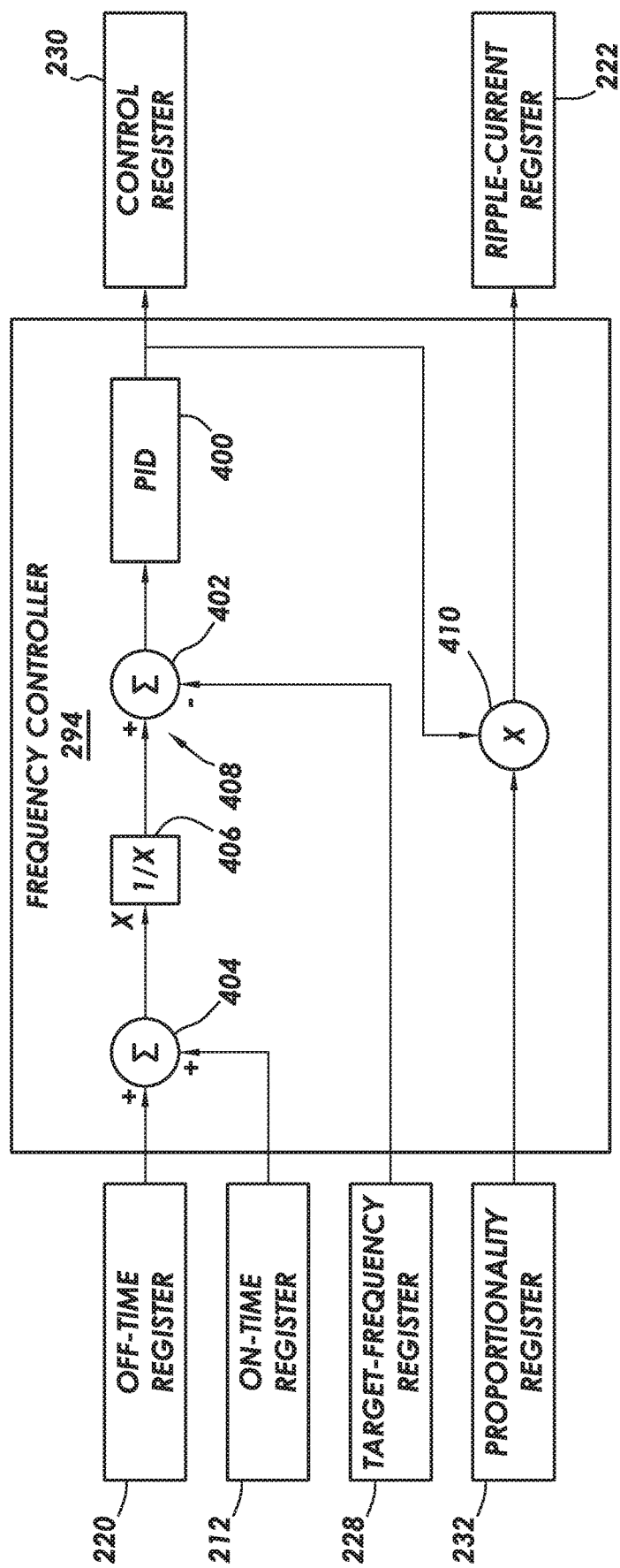
FIG. 4 shows a block diagram of the frequency controller in accordance with at least some embodiments.

FIG. 4 shows a block diagram of the frequency controller 294 in accordance with at least some embodiments. For convenience of the figure, FIG. 4 also shows the off-time register 220, the on-time register 212, the target-frequency register 228, the proportionality register 232, the control register 230, and the ripple-current register 222. The example frequency controller 294 implements some form of proportional-integral-differential (PID) control by way of PID block 400. For example, the PID block 400 may implement proportional-only control, integral-only control, proportional-integral control, and other variants. The PID block 400 takes as input an error signal created by way of summation block 402. The summation block 402 creates the error signal based on a value indicative of switching frequency and the target frequency, such as read for the target-frequency register 228. In the example case of FIG. 4, the value indicative of switching frequency is obtained by reading the off-time register 220, but as discussed above the value indicative of switching frequency is derived from the off-time register 220 and the on-time register 212. In particular, the example frequency controller 294 reads the value in the off-time register 220 and the value in the on-time register 212. The example controller sums the two values, such as by way of summation block 404. The summation has a resultant proportional to the switching period. The switching period is inversely related to the switching frequency, and thus conceptually a value indicative of switching frequency can be created by taking the inverse of the switching period, such as be inverse block 406.

The indication of switching frequency created by the inverse block 406 can then be used to create an error signal indicating an error between the switching frequency and target frequency. In particular, in the example system the frequency controller 294 reads value in the target frequency registers 228, and creates the error signal (e.g., by summation block 208) based on the difference between the switching frequency and the target frequency. The error signal then becomes an input to the PID block 400. Based on the error signal, the PID block 400 updates value in the control register 230. Updating the value in the control register 230 results in a change to the value in the off-time register 220 based on the output voltage. Thus, the example frequency controller 294 will eventually settle at a steady-state condition where the switching frequency matches or closely matches the target frequency held in the target-frequency register 228.

The example frequency controller 294 of FIG. 4 also shows an example system to change the peak current through the inductor by revising the value in the ripple-current register 222. In particular, the example system implements a multiplier 410. The multiplier is coupled to the value in the proportionality register 232 and the output of the PID block 400 (or alternatively, the value in the control register 230). As the name implies, the multiplier 410 produces an output proportional to product of the value in the proportionality register 232 and the value in the control register 230. The product of the multiplier 410 is the value written to the ripple-current register 222. Inasmuch as the frequency controller 294 changes the value in the control register 230 proportional to the changes in output voltage (to regulate frequency), the example multiplier 410 likewise changes the value in the ripple-current register 222 proportionally to output voltage.

Thus, by having the current control loop adjust the value in the proportionality register 232 to cause changes in the value in the ripple-current register 222, the feed-forward aspects of peak current control can be implemented based on the value in the control register 230. The example frequency controller 294 of FIG. 4 is but one example an implementation. One having ordinary skill, and with the benefit of this disclosure, could design may implementations that that would produce satisfactory results in accordance with this disclosure.

Referring again to FIG. 2. Consider, as an example of the both interplay of the current control loop and frequency control loop operation, a situation where the power converter 104 is operating and providing an output voltage in a steady-state condition (e.g., output voltage is constant, input voltage is constant, peak current $I_{MAX}$ is constant, and switching frequency is constant). Now consider that the output voltage increases (e.g., additional LEDs are switched into the circuit). The current controller 244 (e.g., the off-time controller 292) lowers the value in the off-time register 220. The lower value in the off-time register 220 results in the shorter off time and thus, temporarily, higher switching frequency. Additionally, the current controller 244 modifies the value in the proportionality register 232, which results in a modification to the value in the ripple-current register 222, to achieve the set point average current. The frequency controller 294, running the frequency control loop less frequently than the current controller 244 runs the current control loop, eventually sees the increase in switching frequency. Based on the increase in switching frequency, the frequency controller 294 increases the value in the control register 230 such that the value in the off-time register 220 is again lowered. Contemporaneously, the frequency controller 294 increases the value in the ripple-current register 222, which results in higher peak current $I_{MAX}$. That is, an increase in the value in the control register 230 causes the multiplier 410 to produce a product that is larger than previous, and the new product is written to the ripple-current register 222. In this way, the switching frequency of the power converter 104 is reduced closer to the target frequency in the target-frequency register 228. As discussed above, the frequency controller 294 may make step changes in an open-loop sense to bring the switching frequency closer to the target frequency. In other cases (e.g., FIG. 4), the frequency controller 294 may, over several operational cycles of the frequency controller 294, force the switching frequency to match the target frequency by operation of the PID block 400.

Now consider the opposite situation. That is, consider a situation where the power converter 104 is operating and providing an output voltage in a steady-state condition, and then the output voltage decrease (e.g., LEDs are switched out of the circuit). The current controller 244 (e.g., the off-time controller 292) increases the value in the off-time register 220. The increased value in the off-time register 220 results in the longer off time and thus, temporarily, lower switching frequency. Additionally, the current controller 244 modifies the value in the proportionality register 232, which results in a modification to the value in the ripple-current register 222, to achieve the set point average current. The frequency controller 294, running the frequency control loop less frequently than the current controller 244 runs the current control loop, eventually sees the decrease in switching frequency. Based on the decrease in switching frequency, the frequency controller 294 decreases the value in the control register 230 such that the value in the off-time register 220 is again increased. Contemporaneously, the frequency controller 294 decreases the value in the ripple-current register 222, which results in lower peak current $I_{MAX}$. That is, a decrease in the value in the control register 230 causes the multiplier 410 to produce a product that is smaller than previous, and the new product is written to the ripple-current register 222. In this way, the switching frequency of the power converter 104 is raised closer to the target frequency in the target-frequency register 228. As discussed above, the frequency controller 294 may make step changes in an open-loop sense to bring the switching frequency closer to the target frequency. In other cases (e.g., FIG. 4), the frequency controller 294 may, over several operational cycles of the frequency controller 294, force the switching frequency to match the target frequency by operation of the PID block 400.

The various embodiments to this point have assumed that the adjustments to off time and changes to the peak current are implemented based up reading and updating registers. However, one having ordinary skill, and with the benefit of this disclosure, could implement the system in a multitude of different ways. For example, the changes to the peak current could be implemented by an additional controlled current source coupled in parallel with current source 272. The additional controlled current source would produce a current selected to implement changes in peak current implemented by the frequency control loop. Similarly, the adjustment in off time to better control the switching frequency of the could be implemented by directly manipulating the off timer 288.

Figure 5:
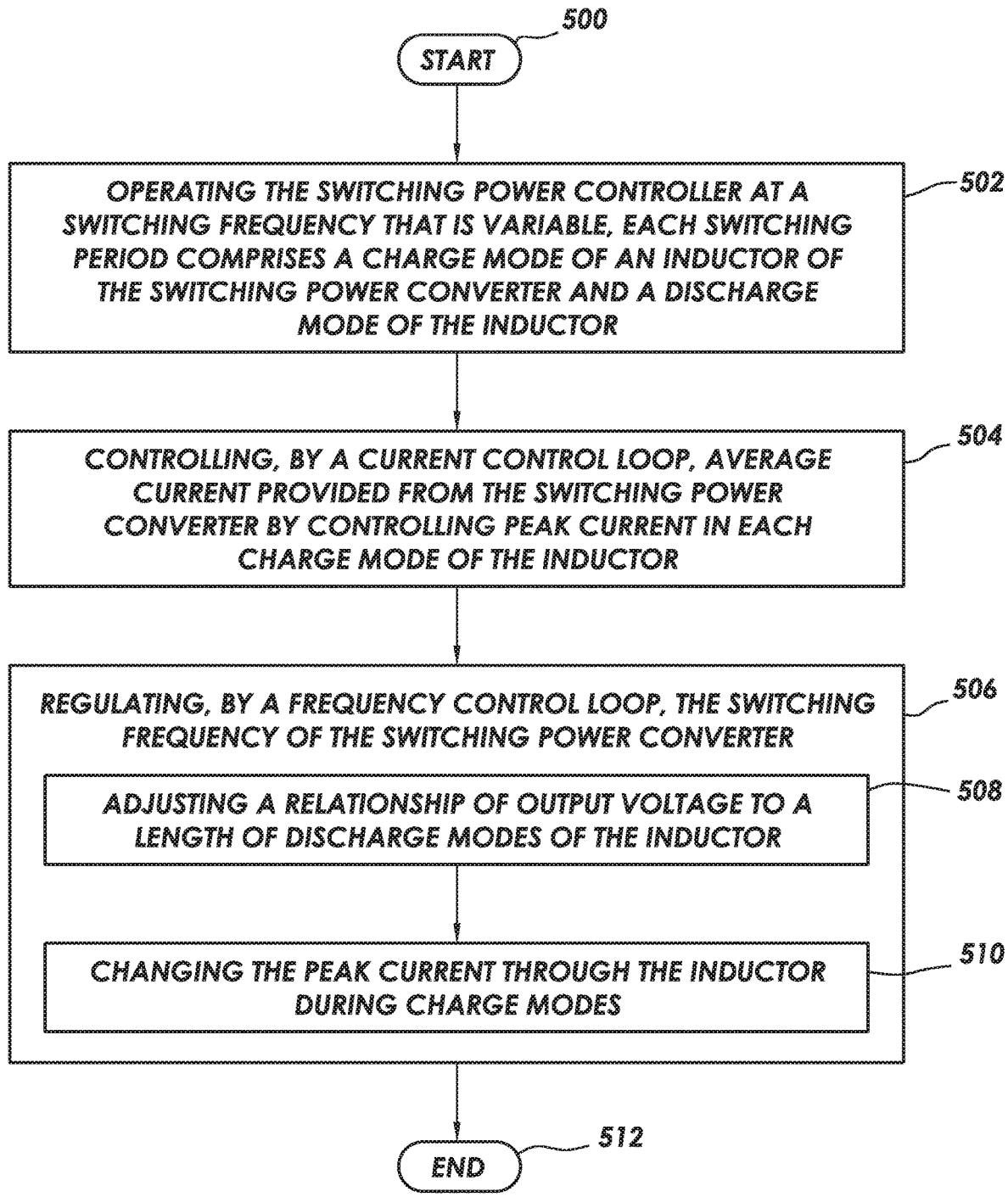
FIG. 5 shows a method accordance with at least some embodiments.

FIG. 5 shows a method accordance with at least some embodiments. In particular, the method starts (block 500) and comprises: operating the switching power controller at a switching frequency that is variable, each switching period comprises a charge mode of an inductor of the switching power converter and a discharge mode of the inductor (block 502); controlling, by a current control loop, average current provided from the switching power converter by controlling peak current in each charge mode of the inductor (block 504); and regulating, by a frequency control loop, the switching frequency of the switching power converter (block 506). Regulating the switching frequency may comprise: adjusting a relationship of output voltage to a length of discharge modes of the inductor (block 508); and changing the peak current through the inductor during charge modes (block 510). Thereafter, the method ends (block 512), likely to be immediately restarted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a switching power converter, the method comprising:
operating the switching power converter at a switching frequency that is variable, each switching period comprises a charge mode of an inductor of the switching power converter and a discharge mode of the inductor;
controlling, by a current control loop, average current provided from the switching power converter by controlling peak current in each charge mode of the inductor; and
regulating, by a frequency control loop, the switching frequency of the switching power converter by:
adjusting a relationship of output voltage to a length of discharge modes of the inductor; and
changing the peak current through the inductor during charge modes.

2. The method of claim 1,
wherein adjusting the relationship of output voltage to the length of discharge modes further comprises adjusting proportional to a change in output voltage; and
wherein changing the peak current through the inductor during charge modes further comprises changing proportional to the change in output voltage.

3. The method of claim 2, wherein adjusting proportional to a change in output voltage further comprises adjusting directly proportional to the change in output voltage.

4. The method of claim 3, wherein changing proportional to the change in output voltage further comprises changing directly proportional to the change in output voltage.

5. The method of claim 1, wherein adjusting the relationship of output voltage to length of discharge modes further comprises modifying a value in a control register of a power controller of the switching power converter, the value in the control register defines a mathematical relationship between the length of discharge modes of the inductor and the output voltage.

6. The method of claim 5, further comprising updating a value indicative of off time of discharge modes, the value indicative of the off time of discharge modes held in an off-time register in the power controller, and the updating proportional to the value in the control register.

7. The method of claim 1, wherein changing the peak current through the inductor during charge modes comprises:
modifying a value in a control register of a power controller of the switching power converter, the value in the control register defines a mathematical relationship between the length of discharge modes of the inductor and the output voltage; and
revising a value in a ripple-current register of the power controller, wherein the peak current through the inductor during charge modes is controlled based on the value in the ripple-current register.

8. The method of claim 7, wherein revising the value in the ripple-current register further comprises revising based on the value in the control register and a proportionality value held in a proportionality register of the power controller of the switching power converter.

9. The method of claim 1,
wherein adjusting the relationship of output voltage to the length of discharge modes further comprises modifying a value in a control register of a power controller of the switching power converter, the value in the control register defines a mathematical relationship between the length of discharge modes of the inductor and the output voltage;
wherein changing peak current through the inductor during charge modes further comprises revising a value in a ripple-current register of the power controller, wherein the peak current is controlled based on the value in the ripple-current register.

10. The method of claim 1, wherein, prior to adjusting the relationship of output voltage to the length of discharge modes, and prior to changing the peak current through the inductor during charge modes, the method further comprises updating a first value indicative of off time held in an off-time register in the switching power converter, the updating based on a change of output voltage and a value in a control register of the switching power converter, the value in the control register defines a mathematical relationship between the length of discharge modes of the inductor and the output voltage.

11. A controller for a switching power converter for driving light-emitting diodes (LEDs), the controller comprising:
   an input voltage terminal, an output voltage terminal, a switch-node terminal, and a bus interface;
   a bus controller coupled to the bus interface;
   an average current register accessible by the bus controller, the average current register configured to hold the value indicative of a set point average current;
   a ripple-current register accessible by the bus controller, the ripple-current register configured to hold a value indicative of ripple current;
   an off-time register accessible by the bus controller, the off-time register configured to hold a value indicative of off time of discharge modes of an inductor;
   a control register accessible by the bus controller, the control register configured to hold a value indicative of a mathematical relationship between a length of discharge modes of the inductor and an output voltage of the switching power converter;
   a power switch that has first lead coupled to the switch-node terminal, a second lead coupled to the input voltage terminal, and a control input;
   a current controller coupled to the ripple-current register, the current controller configured to control an average current provided from the switching power converter by controlling peak current during charge modes of the inductor;
   a frequency controller coupled to the control register, the off-time register, and the ripple-current register, the frequency controller configured to regulate switching frequency of the switching power converter by the frequency controller being configured to:
      adjust the value indicative of the mathematical relationship between the length of discharge modes of the inductor and the output voltage of the switching power converter; and
      change the peak current during charge modes of the inductor.

12. The controller of claim 11,
   wherein when the frequency controller adjusts the relationship of the output voltage to the length of discharge modes, the frequency controller is further configured to adjust proportional to a change in output voltage; and
   wherein when the frequency controller changes the peak current through the inductor during charge modes, the frequency controller is further configured to change proportional to the change in the output voltage.

13. The controller of claim 12, wherein when the frequency controller adjusts the relationship of the output voltage to the length of discharge modes, the frequency controller is further configured to adjust directly proportional to the change in the output voltage.

14. The controller of claim 11, wherein when the frequency controller changes the peak current through the inductor during charge modes, the frequency controller is further configured to revise the value in the ripple-current register, and wherein the peak current through the inductor during charge modes controlled based on the value in the ripple-current register.

15. The controller of claim 14, further comprising:
   a proportionality register accessible by the bus controller, the proportionality register configured to hold a proportionality value;
   wherein when the frequency controller revises the value in the ripple-current register, the frequency controller is further configured to revise based on the value in the control register and the proportionality value in the proportionality register.

16. A system for operating a light-emitting diodes (LED), the system comprising:
   a lighting microcontroller;
   a switching power converter communicatively coupled to the lighting microcontroller;
   an LED coupled to the switching power converter by way of an inductor;
   the switching power converter configured to:
      operate at a switching frequency that is variable, and the operation using a length of discharge modes of the inductor, the length of discharge modes is variable based on an output voltage of the switching power converter;
      control, by a current controller, average current provided to the LED, the current controller configured to control average current by control of peak current through the inductor during charge modes; and
      regulate, by a frequency controller, the switching frequency of the switching power converter by the frequency controller being configured to:
         adjust a relationship of the output voltage to the length of discharge modes; and
         change a peak current through the inductor during charge modes.

17. The system of claim 16,
   wherein when the frequency controller adjusts the relationship of the output voltage to the length of discharge modes, the frequency controller is further configured to adjust proportional to a change in the output voltage; and
   wherein when the frequency controller changes the peak current through the inductor during charge modes, the frequency controller is further configured to change proportional to the change in the output voltage.

18. The system of claim 17, wherein when the frequency controller adjusts the relationship of the output voltage to the length of discharge modes, the frequency controller is further configured to adjust directly proportional to the change in the output voltage.

19. The system of claim 16, wherein the switching power converter further comprises:
   a ripple-current register accessible by the lighting microcontroller, the ripple-current register configured to hold a value indicative of ripple current; and
   wherein when the frequency controller changes the peak current through the inductor during the charge modes, the frequency controller is further configured to revise the value in the ripple-current register, and wherein the peak current through the inductor during the charge modes is controlled based on the value in the ripple-current register.

20. The system of claim 19, wherein the switching power converter further comprises:

a proportionality register accessible by the lighting microcontroller, the proportionality register configured to hold a proportionality value; and wherein when the frequency controller revises the value in the ripple-current register, the frequency controller is further configured to revise based on the value in the control register and the proportionality value in the proportionality register.

* * * * *